June 7, 1927.
L. ALDRIN
SHOCK ABSORBER
Filed Oct. 9, 1925
1,631,569
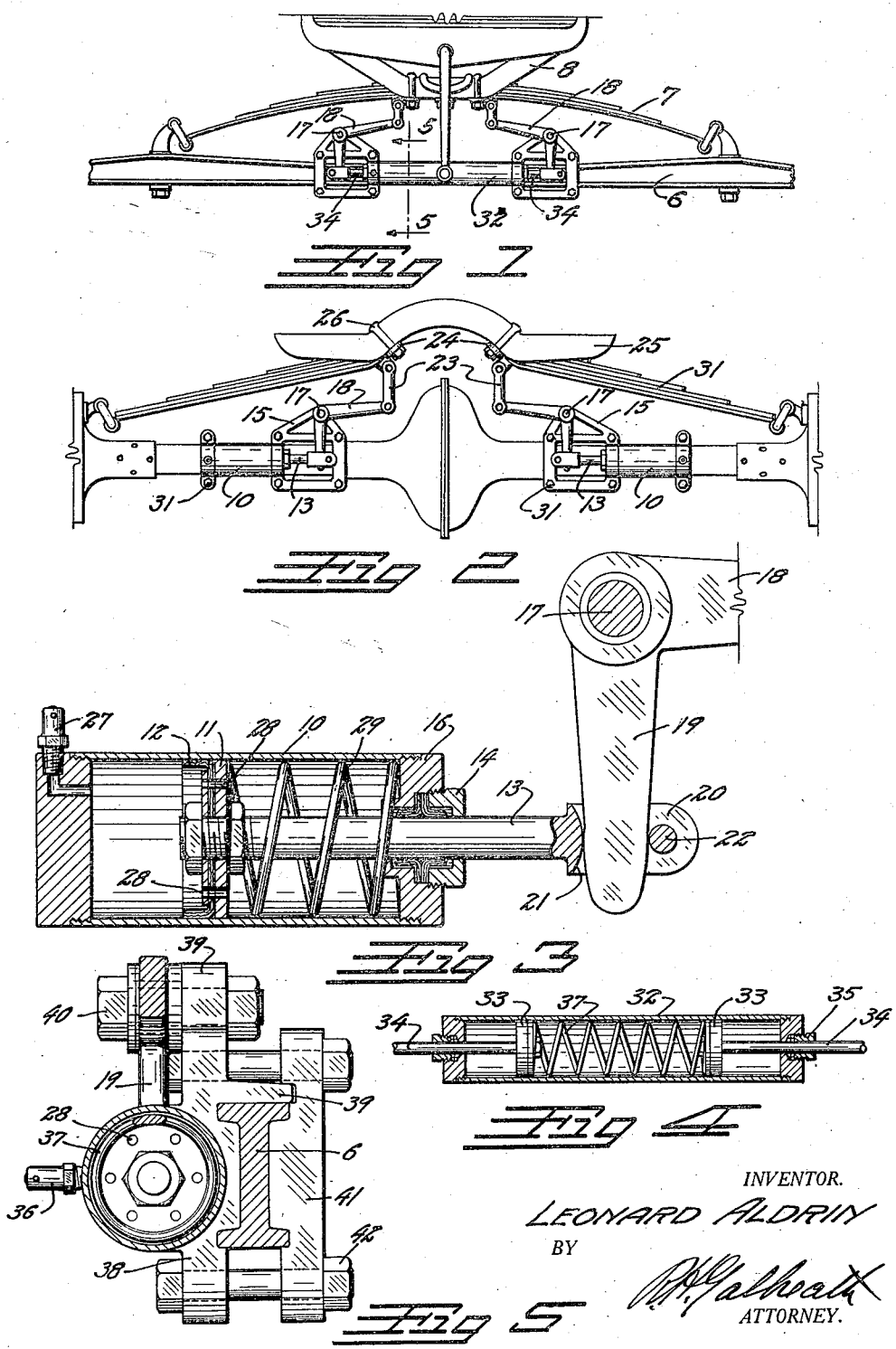
INVENTOR.
LEONARD ALDRIN
BY
ATTORNEY.

Patented June 7, 1927.

1,631,569

UNITED STATES PATENT OFFICE.

LEONARD ALDRIN, OF DENVER, COLORADO.

SHOCK ABSORBER.

Application filed October 9, 1925. Serial No. 61,465.

This invention relates to a shock absorbing device for vehicles to be used in connection with the present spring suspension of the vehicle and has for its principal object the provision of a device of this character which will dampen both the upward and downward movements of the vehicle body and will exert a relatively greater dampening action upon the rebound or upward movement.

Another object of the invention is to provide a device of this character which will act directly between the body and the car axles and will not interfere with or throw additional stresses upon the spring structure.

Still another object is to so construct the invention that it can be readily attached to the present vehicles without it being necessary to alter any of the present construction, and without the necessity of drilling or tapping any additional holes in the vehicle.

A further object is to apply a device of this character to a vehicle without it causing any tendency to allow lateral sway of the body upon the running gear.

A still further object is to provide a shock absorber which will resist tilting or rocking of the body upon the running gear.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates a front elevation of the front axle of an automotive vehicle.

Fig. 2 is a rear elevation of the rear axle of the same.

Fig. 3 is a longitudinal section through the shock absorbing chamber employed on the rear axle.

Fig. 4 is a similar view through the shock absorbing chamber employed on the front axle.

Fig. 5 is a cross sectional view taken on the line 5—5, Fig. 1.

In the drawing, portions of a vehicle are designated as follows: front axle 6, front spring 7, front chassis support 8, rear axle 30, rear spring 31, and rear chassis support 25.

The shocks are absorbed through the medium of horizontal cylinders. On the rear axle of the vehicle I employ two such cylinders, 10, similar in construction, secured to the axle by clamp bolts 31. Each cylinder 10 is provided with a piston 11 provided with a compression washer 12 and carried on a piston rod 13 which extends through a packing gland 14 in the head of the cylinder 10.

A pivot bracket 15 is formed integrally with the head 16 of the cylinder 10 and carries a pivot pin 17. A bell crank lever 18 is maintained upon the pivot 17, the downwardly extending arm 19 of which engages the extremity of the piston rod 13 as illustrated in Fig. 3. This engagement is maintained by forming a bifurcated extremity 20 upon the piston rod, in which, an arcuate surface 21 and a pin 22 contact with opposite sides of the arm 19. By this arrangement, the vertical movement of the extremity of the arm 19 is provided for. The long arm of the bell crank lever extends substantially horizontal to a connection with a connecting link 23 which in turn hinges to an attachment clip 24, secured to the rear chassis support 25 by means of a U-bolt 26.

Movement of the piston 11 in the cylinder 10 is resisted by a fluid such as "alemite" with which the cylinder is filled. The fluid is introduced through a compression coupling 27 through the medium of any of the usual grease guns at present employed for greasing automobiles. Movement is imparted to the piston by the variations in distance between the vehicle body and the axle through the medium of the link 23 and the bell crank lever 18.

As the piston moves in the cylinder, the fluid ahead of the piston will pass through ports 28 formed in the piston to fill the increasing space in the rear thereof. The size of the ports 28 is determined by the amount of dampening action desired.

It is more essential in a device of this character that the rebound or upward movement of the body be resisted, since this movement is the one which causes discomfort to the passengers. To provide this increased resistance to upward movement, I install a spring 29 between the piston 11 and the cylinder head 16. Since upward movement of the body causes the piston to move toward the cylinder head, this upward movement will be resisted by both the spring 19 and the flow of the fluid through the ports 28, while downward movement will only be resisted by the fluid.

On the front axle 6 of the vehicle, I provide a common cylinder 32, illustrated in cross section in Fig. 4. In the cylinder 32 are two pistons 33 having oppositely extending piston rods 34 which project through packing glands 35 at each extremity of the cylinder. The piston rods 34 are operated by an operating mechanism similar in construction to that previously described with reference to the rear axle. In this case, however, the U-bolts 26 and the attachment clips 24 are secured to the front chassis member 8. The cylinder is filled with fluid through a compression coupling 36 as in the case of the cylinder 10. A spring 37 is interposed between the two pistons 33.

As the body of the vehicle moves upward with relation to the axle 6, the bell crank levers 18 will cause the two pistons 33 to approach each other. This movement is resisted by the spring 37 so as to check the rebound. The movement of the pistons is also resisted as in the previous case, by the flow of the fluid through the ports 28 in both the pistons 33.

The usual front axle 6 has an I-beam cross section. To securely clamp the cylinder 32 to the axle, I provide a bracket 38 having a contour adapted to fit into the forward side of the I-beam and provided with a projecting tongue 39 which rests upon the axle 6 and supports the weight of the device. The bracket 38 has an upwardly extending portion 39 which carries a pivot shaft 40 for the bell crank lever 18. A clamp 41 is provided having a contour to fit to the rear side of the I-beam. The bracket 38 and the clamp 41 are clamped together by means of clamp bolts 42 so as to snugly enclose the front axle.

While a specific form of the improvement has been described and illustrated herein, it is desired to be understood that the same may be varied, within the scope of the appended claims, without departing from the spirit of the invention.

It is desired to call attention to the fact that there is no direct upward lift or downward drag on the axle, inasmuch as the resistance of the cylinders is horizontally applied and the body action is vertically applied, the resultant force on the fulcrum will act on a 45° angle.

Types of snubbers at present on the market at times act to lift the wheels from the ground thereby causing great wear and tear on the tires. This action is eliminated in the present device.

Having thus described the invention what I claim and desire secured by Letters Patent is:—

1. A shock absorber for a vehicle comprising a cylinder arranged for attachment to the axle of said vehicle; opposed pistons carried in said cylinder; piston rods arranged to project from opposite ends of said cylinder; bell crank levers arranged for attachment to the body of said vehicle at their one extremity and operatively connected to said piston rods at their other extremity so as to cause said pistons to approach each other as said body moves upward.

2. The combination in a vehicle having a leaf spring parallel to and connected with an axle, of a frame arranged to fit against one face of said axle; a clamping member arranged to fit against the opposite face of said axle; and means for drawing said clamping member toward said frame; a cylinder carried by said frame; a bell crank carried by said frame; a connection between said vehicle and one extremity of said bell crank; and a piston in said cylinder operatively connected to the opposite extremity of said bell crank.

3. The combination in a vehicle having a leaf spring parallel to and connected with an axle, of a frame secured to said axle; a cylinder carried by said frame; a bell crank carried by said frame; a connection between said vehicle and one extremity of said bell crank; a piston in said cylinder operatively connected to the opposite extremity of said bell crank; a spring arranged to be compressed by said piston as said vehicle moves away from said axle; and passages arranged to allow fluid to pass through said piston as said vehicle approaches said axle.

In testimony whereof, I affix my signature.

LEONARD ALDRIN.